Jan. 6, 1942.  J. S. ANDREWS  2,268,540
COMBINATION FLOOR FURNACE AND EVAPORATIVE COOLING UNIT
Filed Jan. 15, 1940  3 Sheets-Sheet 1
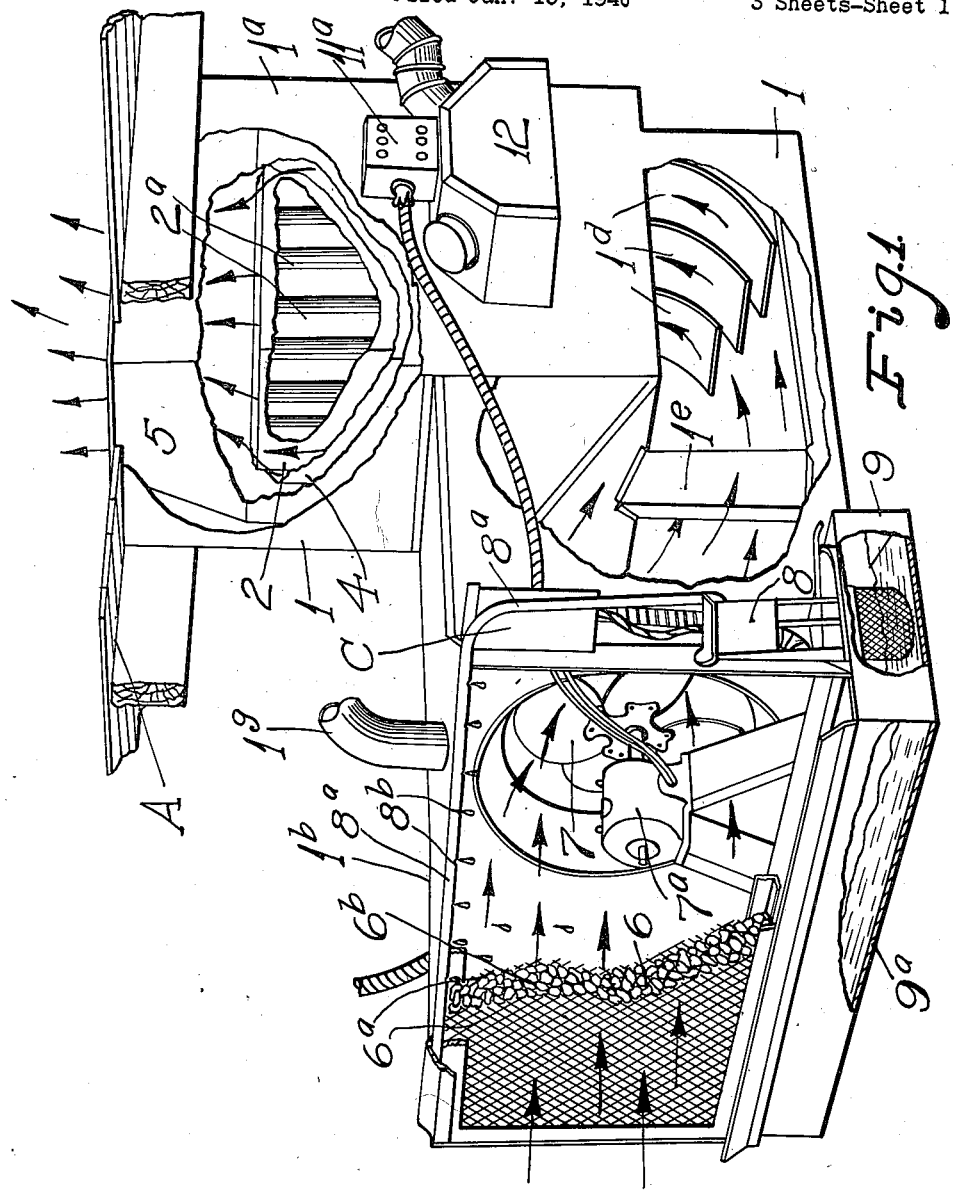
INVENTOR.
John S. Andrews
BY
A. B. Bowman
ATTORNEY.

Jan. 6, 1942. J. S. ANDREWS 2,268,540
COMBINATION FLOOR FURNACE AND EVAPORATIVE COOLING UNIT
Filed Jan. 15, 1940 3 Sheets-Sheet 2
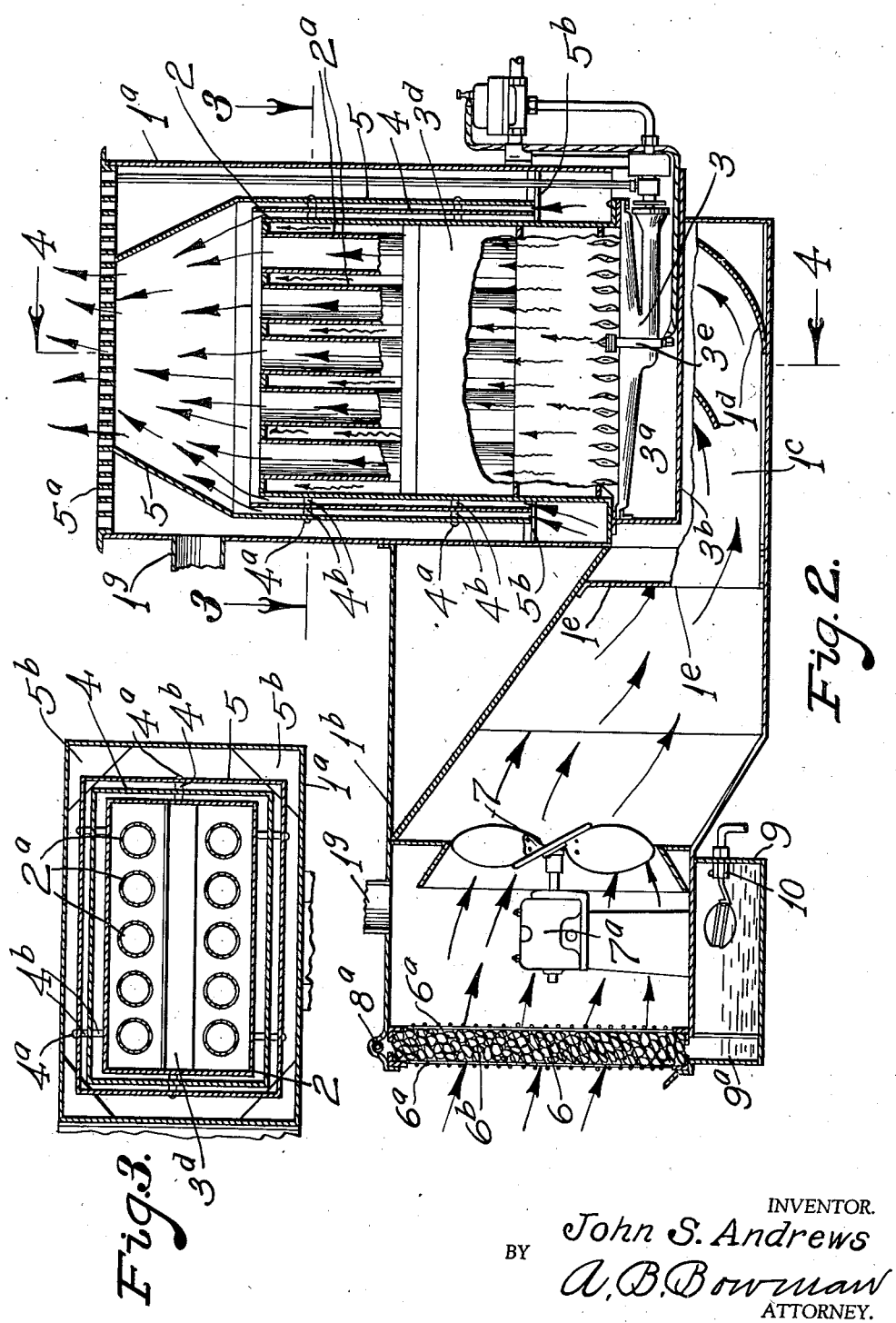
INVENTOR.
John S. Andrews
BY
A. B. Bowman
ATTORNEY.

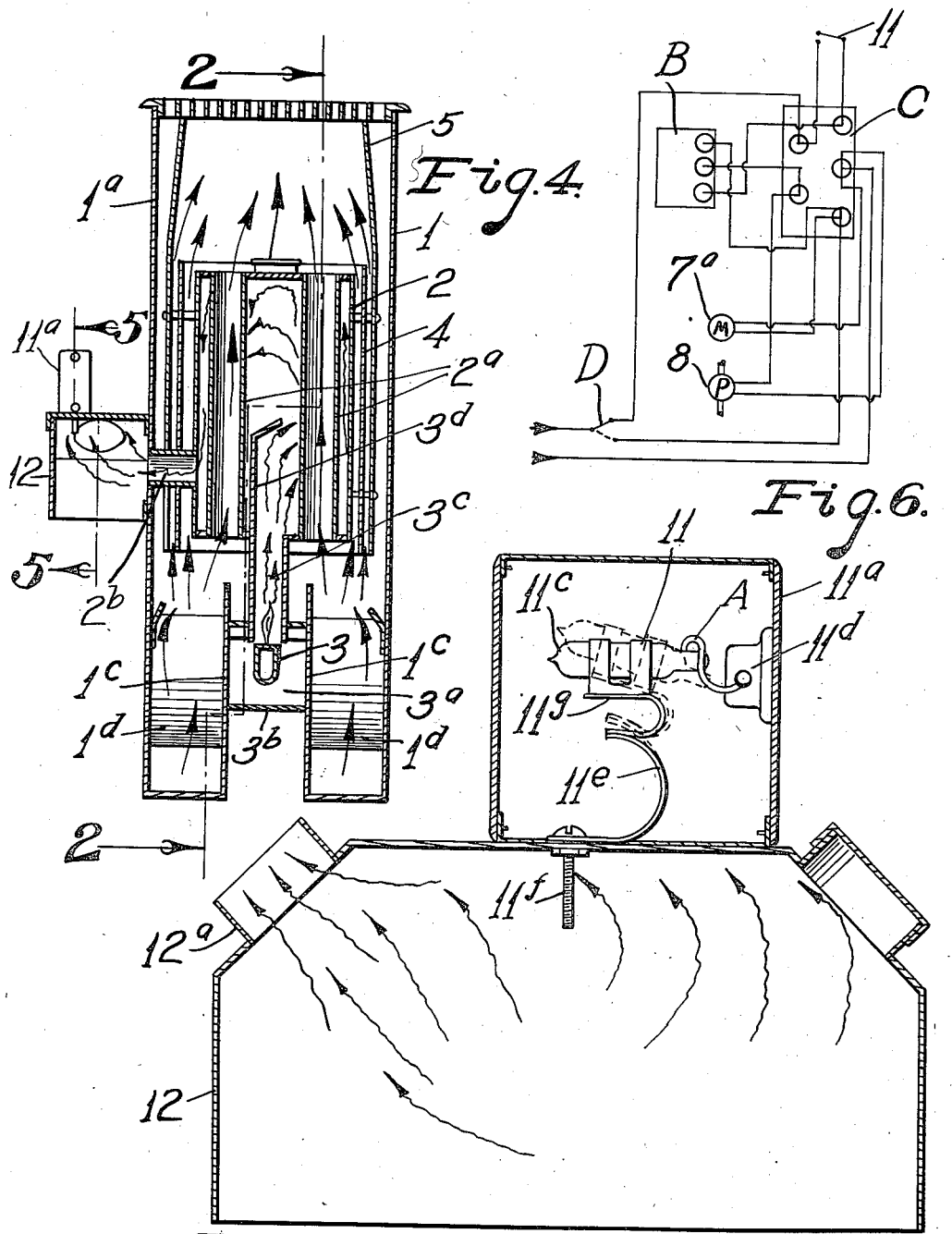

Patented Jan. 6, 1942

2,268,540

UNITED STATES PATENT OFFICE 2,268,540

COMBINATION FLOOR FURNACE AND EVAPORATIVE COOLING UNIT

John S. Andrews, Los Angeles, Calif.

Application January 15, 1940, Serial No. 313,822

14 Claims. (Cl. 126—113)

My invention relates to a combination floor furnace and evaporative cooling unit and the objects of my invention are:

First, to provide a unit of this class which embodies the combined structural elements of both a floor furnace and an evaporative cooling means;

Second, to provide a unit of this class which will heat rooms in the winter and cool them in the summer and which is substantially automatic throughout;

Third, to provide a unit of this class which delivers warm or cool air as desired directly from a heater through a grate in the floor of the room to be conditioned;

Fourth, to provide a unit of this class in which water is held in suspension by porous wall of pumice stone which provides greater vaporization and more efficient purifying and humidifying of either warm or cool air;

Fifth, to provide a unit of this class in which warm conditioned air from the floor furnace is conducted directly into the room to be heated or cooled, thereby providing a unit in which warmth or coolness of the conditioned air is not dissipated in a lengthy conductor passage;

Sixth, to provide a unit of this class which will automatically operate entirely within the floor surface as a gravity actuated floor furnace, if the fan therein or forced air circulating means should at any time fail, thereby reducing the fire hazard to a minimum; and Seventh, to provide a unit of this class which is very simple and economical of construction, efficient and economical of operation and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a perspective view of my combination floor furnace and evaporative cooling unit showing portions broken away and in section to facilitate the illustration and also showing by arrows the direction of movement of air through my combination floor furnace and evaporative cooling unit; Fig. 2 is a longitudinal sectional view thereof taken from the angular line 2—2 of Fig. 4 showing a portion broken away; Fig. 3 is a fragmentary sectional view taken from the line 3—3 of Fig. 2; Fig. 4 is a transverse vertical sectional view taken from the line 4—4 of Fig. 2; Fig. 5 is a sectional view taken from the line 5—5 of Fig. 4 showing parts and portions in elevation to facilitate the illustration and Fig. 6 is a diagrammatic of this electric wiring in connection with operating parts.

Similar characters of reference refer to similar parts and portions throughout the several views of the drawings:

The main casing 1, floor furnace fire box 2, floor furnace burner 3, air directing casings 4 and 5, evaporative cooling wall 6, fan 7, pump 8, water tank 9, float valve 10, thermostatic switch 11 and the flue casing 12 constitute the principal parts and portions of my combination floor furnace and evaporative cooling unit.

The main casing 1 is provided with a substantially vertical casing portion 1a in which is positioned the furnace portion of my combination floor furnace and evaporative cooling unit and it is also provided with a substantially horizontally extending portion 1b in which is positioned the evaporative cooling portions thereof and the air circulating fan 7, together with the driving motor 7a, as shown best in Figs. 1 and 2 of the drawings.

Positioned in the upper side of the horizontal portion 1b of the casing 1 is a downdraft air conductor tube 1g communicating with the intake side of the fan 7. This tube 1g at its other end communicates with the inner side of the vertical portion 1a of the main casing 1 near its upper end.

Positioned in the open end of the casing portion 1b is the evaporative cooling wall 6 which is composed of screens 6a which are positioned in spaced relation with each other and pumice stone 6b interposed between said screens 6a. Positioned beneath this evaporative cooling wall 6 is a trough 9a communicating with the water tank 9, as shown best in Figs. 1 and 2 of the drawings. The electric water pump 8, as shown best in Fig. 1 of the drawings is in communicative relation with water in the tank 9. This pump 8 forces water through the conductor tube 8a which is positioned longitudinally over the upper edge of the evaporative cooling wall 6, as shown best in Figs. 1 and 2 of the drawings and the water drips downwardly through the holes 8b of the water conducting tube 8a onto the evaporative cooling wall 6, as shown best in Fig. 1 of the drawings.

The fan 7 in connection with the motor 7a is arranged to force air through the evaporative cooling wall 6, as indicated by arrows in Figs. 1 and 2 of the drawings. The burner 3 is positioned in the burner compartment 3a as shown best in Figs. 2 and 4 of the drawings. This burner compartment 3a is enclosed at its sides by means of the upturned portions 1c of the main casing 1, as shown best in Fig. 4 of the drawings and is enclosed at its lower side and its one end by means of the member 3b as shown best in Fig. 2 of the drawings. Positioned at opposite sides of the burner compartment 3a are curved air baffles 1d, as shown best in Figs. 2 and 4 of the drawings. Positioned in spaced relation with the enclosed end of the burner compartment 3a is the air baffle member 1e which is angular in form and connects with the upturned portions 1c of the main casing 1 at opposite sides of the burner compartment 3a, as shown best in Figs. 1, 2 and 4 of the drawings.

Communicating with the burner 3 by means of the heat passage 3c is the floor furnace fire box 2 which is positioned above said burner 3 and arranged to radiate heat outwardly toward the air directing casings 4 and 5. The casing 5 conforms in spaced relation with the outer side of the fire box 2 and is supported at its lower end in the main casing 1 at its corners by brackets 5b secured on the inner side of the main casing 1. Interposed between the casing 5 and the fire box 2 is the casing 4 which is supported and held in position by bolts 4a and spacers 4b thereon. The fire box 2 is provided with a plurality of air conducting tubes 2a through which purified air may pass when being heated by conduction in connection with the hot gases in the fire box 2. The upwardly extending baffle member 3d is arranged to direct the hot gases and distribute the heat evenly around the air conducting tubes 2a. This fire box 2 is also provided with a flue gas outlet conductor 2b which communicates with the interior of the flue casing 12, as shown best in Fig. 4 of the drawings. My combination floor furnace and evaporative cooling unit, as shown best in Fig. 2 of the drawings is provided with a grill 5a on its upwardly extending end and is arranged to be positioned in a floor of a room, as indicated at A in Fig. 1 of the drawings.

The thermostatic switch 11 is positioned in a casing 11a on the flue casing 12. This thermostatic switch 11 is composed of a mercury bulb 11c in which are positioned contacts communicating with the wires A and the plug 11d. The mercury bulb 11c is mounted on a bi-metal spring 11e which is secured on a bolt 11f extending downwardly into the flue casing 12. Secured on the upper end of this bi-metal spring 11e is a U-shaped spring 11g on which is connected the bulb 11c.

The flue casing 12 is provided with a flue connection 12a through which flue gases may pass therefrom to atmosphere. It will be noted that the flue casing 12 is a substantially conventional downdraft diverter.

The wiring diagram, as shown in Fig. 6 of the drawings shows the thermostatic switch 11 in cooperative relation with an auxiliary switch D for making and breaking the electrical circuit to the motor 7a and the pump 8. The reduction transformer B is electrically connected with the motor 7a and the pump 8 providing the option of varying speeds of the motor 7a and the pump 8 by means of the auxiliary switch D. It will be noted that connection of the various wires in this diagram are made in the box C as shown best in Figs. 1 and 6 of the drawings.

The operation of my combination floor furnace and evaporative cooling unit is substantially as follows: When it is desired to heat a room with my combination floor furnace and evaporative cooling unit, the burner 3 is lit by means of the pilot 3e and the fire box 2 is heated and flue gases passing outwardly through the flue casing 12 heat the bolt 11f and the bi-metal spring 11e in temperature conductive relation therewith, causing said bi-metal spring 11e to shift into the dash line position, as shown in Fig. 5 of the drawings. The spring 11g in connection with said bi-metal spring 11e tilts the mercury bulb 11c causing the mercury to flow backwardly into the contact end thereof thereby closing an electrical circuit to the motor 7a in connection with the fan 7, as well as the pump 8. The fan 7, operated by the motor 7a, forces air through the evaporative cooling wall 6, inwardly around the burner compartment 3a and over the air baffles 1d and around the air baffle 1e upwardly through the tubes 2a in the fire box 2 and around the fire box 2 intermediate the air directing casings 4 and 5 upwardly through the grille 5a and into the room to be conditioned. It will be noted that air also passes downwardly through the grille 5a around the air directing casing 5, through the downdraft air conducting tube 1g and to the intake side of the fan 7 and is thereby circulated and reconditioned and passes into the room above the grille 5a. In the summertime, when it is desired to cool the room to be conditioned, the burner 3 is shut off and the motor 7a is energized by means of an auxiliary switch D as shown best in Fig. 6 causing the fan 7 to force air through the evaporative cooling wall 6 at fairly high speed causing considerable evaporation and correspondingly lower temperature of the conditioned air. The transformer B in connection with the switch D provides a reduction of voltage when it is desired to run the fan and pump slowly in cooperation with the furnace for heating a room.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a combination floor furnace and evaporative cooling unit of the class described, the combination of a floor furnace arranged for either gravity or forced circulation connected with and adjacent the floor of a room and an evaporative cooling means cooperatively connected with said floor furnace for controlling the flow and humidification of air through said floor furnace and the floor of a room.

2. In a combination floor furnace and evaporative cooling unit of the class described, the combination of a floor furnace arranged for either gravity or forced circulation connected with and adjacent the floor of a room and an evaporative cooling means cooperatively connected with said floor furnace for controlling the flow and humidification of air through said floor furnace and the floor of a room, said furnace including a fire box with vertically disposed air passage tubes positioned therein.

3. In a combination floor furnace and evaporative cooling unit of the class described, the combination of a floor furnace arranged for either gravity or forced circulation connected with and adjacent the floor of a room, an evaporative cooling means cooperatively connected with said floor furnace for controlling the flow and humidification of air through said floor furnace and the floor of a room, said furnace including a fire box with vertically disposed air passage tubes positioned therein, air directing casings positioned around said fire box in spaced relation with each other and said fire box.

4. In a combination floor furnace and evaporative cooling unit of the class described, the combination of a floor furnace arranged for either gravity or forced circulation connected with and adjacent the floor of a room, an evaporative cooling means cooperatively connected with said floor furnace for controlling the flow and humidification of air through said floor furnace and the floor of a room, said furnace including a fire box with vertically disposed air passage tubes positioned therein, air directing casings positioned around said fire box in spaced relation with each other and said fire box, one of said air directing casings extending upwardly to the floor of said room.

5. In a combination floor furnace and evaporative cooling unit of the class described, the combination of a floor furnace arranged for either gravity or forced circulation connected with and adjacent the floor of a room, an evaporative cooling means cooperatively connected with said floor furnace for controlling the flow and humidification of air through said floor furnace and the floor of a room, said furnace including a fire box with vertically disposed air passage tubes positioned therein, air directing casings positioned around said fire box in spaced relation with each other and said fire box, one of said air directing casings extending upwardly to the floor of said room, and a burner positioned at the middle portion of said firebox with said air passage tubes open at opposite sides thereof communicating with the evaporating cooling portion of said unit.

6. In a combination floor furnace and evaporative cooling unit of the class described, the combination of a floor furnace connected with below and adjacent the floor of a room, and an evaporative cooling means connected with the lower end of said floor furnace, and provided with an evaporative cooling wall and a fan for forcing air through said wall and said floor furnace and gravity circulating means wholly within said floor furnace.

7. In a combination floor furnace and evaporative cooling unit of the class described, the combination of a floor furnace connected with below and adjacent the floor of a room, an evaporative cooling means connected with the lower end of said floor furnace, and provided with an evaporative cooling wall, a fan for forcing air through said wall and said floor furnace, gravity circulating means wholly within said floor furnace, and a fire box positioned in said furnace provided with vertical air conducting tubes therein.

8. In a combination floor furnace and evaporative cooling unit of the class described, the combination of a floor furnace connected with below and adjacent the floor of a room, an evaporative cooling means connected with the lower end of said floor furnace, and provided with an evaporative cooling wall, a fan for forcing air through said wall and said floor furnace, gravity circulating means wholly within said floor furnace, a fire box positioned in said furnace provided with vertical air conducting tubes therein, and a thermostatic electrical switch in connection with said fire box for electrically controlling said fan.

9. In a combination floor furnace and evaporative cooling unit of the class described, the combination of a floor furnace connected with below and adjacent the floor of a room, an evaporative cooling means connected with the lower end of said floor furnace, and provided with an evaporative cooling wall, a fan for forcing air through said wall and said floor furnace, gravity circulating means wholly within said floor furnace, a fire box positioned in said furnace provided with vertical air conducting tubes therein, a thermostatic electrical switch in connection with said fire box for electrically controlling said fan, and air directing casings arranged to conduct air from said fan around said fire box.

10. In a combination floor furnace and evaporative cooling unit of the class described, the combination of a floor furnace connected with below and adjacent the floor of a room, an evaporative cooling means in connection therewith at its lower end, said furnace including a burner and air passages at opposite sides thereof communicating with said evaporative cooling means, and a fire box positioned above said burner and provided with air conducting tubes extending therethrough communicating with said air passages at opposite sides of said burner and angular jacket means surrounding said fire box and providing passages for downwardly directed air currents by thermal action.

11. In a combination floor furnace and evaporative cooling unit of the class described, the combination of a floor furnace connected with below and adjacent the floor of a room, an evaporative cooling means in connection therewith at its lower end, said furnace including a burner and air passages at opposite sides thereof communicating with said evaporative cooling means, a fire box positioned above said burner and provided with air conducting tubes extending therethrough communicating with said air passages at opposite sides of said burner, and air directing casings around said fire box for radiatively heating air around said fire box one of said casings provided with upwardly and inwardly converging portions near said floor providing an air passage outwardly thereof for downwardly directed thermally affected air.

12. In a combination floor furnace and evaporative cooling unit of the class described, the combination of a floor furnace connected with below and adjacent the floor of a room, an evaporative cooling means provided with an evaporative cooling wall, a fan for forcing air through said cooling wall and said floor furnace, a fire box positioned in said furnace provided with vertical air conducting tubes therein and a downdraft air conductor passage means communicating at its one end with the interior of said furnace above said fire box extending downwardly and communicating at its other end with the intake side of said fan.

13. In a combination floor furnace and evaporative cooling unit of the class described, the combination of a floor furnace connected with below and adjacent the floor of a room, an evaporative cooling means provided with an evaporative cooling wall, a fan for forcing air through said cooling wall and said floor furnace, a fire box positioned in said furnace provided with vertical air conducting tubes therein and a downdraft air conductor passage means communicating at its one end with the interior of said furnace above said fire box extending downwardly and communicating at its other end with the intake side of said fan, and a thermostatic electrical switch in connection with said fire box for electrically controlling said fan.

14. In a combination floor furnace and evaporative cooling unit of the class described, the combination of a floor furnace connected with below and adjacent the floor of a room, an evaporative cooling means provided with an evaporative cooling wall, a fan for forcing air through said cooling wall and said floor furnace, a fire box positioned in said furnace provided with vertical air conducting tubes therein and a downdraft air conductor passage means communicating at its one end with the interior of said furnace above said fire box extending downwardly and communicating at its other end with the intake side of said fan, a thermostatic electrical switch in connection with said fire box for electrically controlling said fan, and air directing casings arranged to conduct air from said fan around said fire box.

JOHN S. ANDREWS.